United States Patent [19]

Arinaga

[11] Patent Number: 4,571,224
[45] Date of Patent: Feb. 18, 1986

[54] BELT DRIVE SYSTEM
[75] Inventor: Kuniomi Arinaga, Nara, Japan
[73] Assignee: Unitta Co., Ltd., Osaka, Japan
[21] Appl. No.: 517,257
[22] Filed: Jul. 26, 1983
[30] Foreign Application Priority Data Jul. 27, 1982 [JP] Japan .................................. 57-131698
Mar. 9, 1983 [JP] Japan .................................. 58-034672

[51] Int. Cl.⁴ .............................................. F16H 7/02
[52] U.S. Cl. ...................................... 474/153; 474/205
[58] Field of Search .................................. 474/205, 202

[56] References Cited
U.S. PATENT DOCUMENTS 4,332,576 6/1982 Stecklein et al. .................... 474/205
4,416,649 11/1983 Kohrn ............................ 474/205 X Primary Examiner—James A. Leppink
Assistant Examiner—Frank McKenzie
Attorney, Agent, or Firm—Armstrong, Nikaido, Marmelstein & Kubovcik

[57] ABSTRACT

A belt drive system comprising a toothed belt having a plurality of equally spaced teeth on the surface of the belt body and toothed pulleys having a plurality of equally spaced teeth to engage with the belt teeth on the surface of the pulley body of each pulley. The belt teeth have one or more cut grooves in the longitudinal direction of the belt and the toothed pulleys have one or more ribs, to engage with the cut grooves in the belt teeth, on the surface of the pulley body of each pulley.

9 Claims, 10 Drawing Figures

BELT DRIVE SYSTEM

BACKGROUND OF THE INVENTION

The present invention relates to a belt drive system. More particularly, it relates to a belt drive system which comprises a toothed belt having cut grooves in the teeth in the longitudinal direction of the belt and toothed pulleys having one or more ribs, to engage with the cut grooves in the belt teeth, on the surface of the pulley body of each pulley.

Generally, the toothed belt in the belt drive system comprising mainly a belt and pulleys has a plurality of equally spaced teeth, in the longitudinal direction of the belt, on the surface of the belt body which includes tensile members therein. The surface of the toothed belt is covered with rubber cloth or treated with elastomers such as polyurethane which are excellant in wear-resistance. As shown in FIG. 1(a), the surfaces 101 and 102 of the conventional toothed belt 100 are smooth. When the toothed belt engages with toothed pulleys, the bottom of the tooth cavity 102 of the belt teeth comes into contact with the exterior surface of the pulley teeth, resulting in plosive sounds of compressed air caused by a sudden discharge of the compressed air from spaces between the belt teeth and the pulley teeth when the belt engages with the pulley. As the engagement of the belt with pulleys is carried out at higher speed, the plosive sounds become louder.

The conventional toothed belt is inferior in durability because the bottom of the tooth cavities wears considerably when it comes into contact with the pulley teeth. In order to reduce the wear of the bottom of the belt tooth cavities, it is necessary to enlarge the bottom area of the belt tooth cavities thereby minimizing the belt contact pressure per unit area of the pulley surface. However, the theoretical tooth width (i.e. the length of the tooth base in the longitudinal direction of the belt) must be wider to insure that the toothed belt has strong and wear-resistant belt teeth. As a result, the conventional toothed belt provides for a large bottom area of the belt tooth cavacities but narrow width: that is, the wear-resistance of the belt is considered more important than the tooth strength. Thus, most conventional toothed belts have a weakness in tooth strength and cannot be applied to a cam shaft drive of large vehicles such as trucks and buses requiring a large capacity belts.

Moreover, the toothed belt tends to move in a zigzag direction or slip sideways during belt drive, resulting in a heat generation and/or belt wear. Such belt slippage may be reduced by flanges to be disposed on the pulleys. However, a substantial area of the pulleys in contact with the belt is reduced by these flanges, thereby decreasing the belt capacity.

The flanges are essential to the conventional pulleys, so that the configuration of the pulleys is complicated and low priced production of pulleys having a consistant quality is not easy.

U.S. Pat. No. 2,988,925 discloses such a toothed belt 103 as shown in FIG. 1(b), wherein narrow and shallow grooves 105 are disposed in the top of the teeth 104, along the length of the teeth 104. Publication of Japanese Application for patent (Tokkyo-Kokoku) No. 47-34433 (34433/1972) discloses such a pulley 106 as shown in FIG. 1(c), wherein a plurality of narrow and shallow grooves 108 are disposed in the pulley teeth 107 in the longitudinal direction with respect to a belt which engages with this pulley. Alternatively the grooves are helically disposed in the pulley teeth. Both of the above prior arts are aimed only at reducing the plosive sounds occuring during engagement of the toothed belts with the toothed pulleys, but never simultaneously solve the problems of both the zigzag movement or slide of the belt on the pulley and the resulting heat-generation and belt-wear.

Moreover, toothed belts are used as timing transmission belts transmitting power by means of engagement with pulley teeth, while V-belts are used for transmitting power by means of frictional force generated between the V-belts and pulleys. Both belts are of a different nature. Thus, it has been understood by those skilled in the art that a combination of concept and function of both toothed belts and V-belts would be senseless and unpractical.

SUMMARY OF THE INVENTION

This invention was based on new knowledge of the inventor that the combination of the timing transmission function of toothed belts with the straight drive function of V-belts can attain a function-synergism and an effect-synergism beyond an aggregation of functions and advantages which both belts hold inherently.

The belt drive system of this invention which overcomes the above-discussed disadvantages of the prior arts, comprises a toothed belt having a plurality of equally spaced teeth on the surface of the belt body which includes tensile members therein, said teeth having one or more cut grooves in the longitudinal direction of the belt; and toothed pulleys having a plurality of equally spaced teeth, which engage with the belt teeth, and one or more ribs, which engage with the cut grooves in the belt teeth, on the surface on the pulley body of each pulley. The depth of said cut grooves ranges from about 60 to about 100 percent of the height of the belt teeth and the open angle of said cut grooves from about 30 to about 50 degrees. The ratio of the theoretical tooth width to the tooth land length ranges from about 0.8 to about 2. The ratio of the open angle of said cut grooves in the belt to the angle of said ribs on the pulleys ranges from about 0.7 to about 1.

A process for production of the toothed pulleys, comprises:
(1) producing toothed pulley parts each of the which is provided with a plurality of equally spaced teeth, parallel to the rotation axis, on the surface of the pulley part body and a rib, vertical to the rotation axis, along its one side,
(2) aligning the rotation axes and the teeth of said pulley parts with each other, and
(3) uniting said pulley parts by means of a fixing means.

Another process for production of the toothed pulleys, comprises:
(1) producing toothed pulley parts which are provided with a plurality of equally spaced teeth, parallel to the rotation axis, on the surface of the pulley part body,
(2) producing disc-shaped rib parts, the exterior surface of each of which is flush with or inside of the exterior surface of the pulley teeth,
(3) aligning the teeth of the pulley parts and the rotation axes of both said toothed pulley parts and said rib parts with each other, and
(4) uniting said pulley parts and said rib parts by means of a fixing means.

Thus, the invention described herein makes possible the objects of (1) providing a belt drive system which can reduce plosive sounds derived from vigorous surface contact of the belt with the pulleys; (2) providing a belt drive system wherein the belt neither moves in a zigzag direction nor slips sideways on the pulleys; (3) providing a belt drive system in which the belt maintains a straight alignment with the pulleys; (4) providing a belt drive system minimizing heat generation and wear of the belt; (5) providing a belt drive system excellent in wear-resistance; (6) providing a belt drive system having a belt with sufficient tooth-strength i.e. shearing stress; (7) providing a belt drive system wherein pulleys are not provided with flanges; (8) providing a belt drive system which is useful, due to the high load carrying capacity or the belt for driving the cam shaft of large vehicles, e.g. trucks and buses which require such belts, and for rear wheel driving of motorcycles; and (9) providing a belt drive system which is useful for paper currency changing machines and automatic ticket-examination machines both of which cannot be operated with belts which zigzag or slip horizontally.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1A:
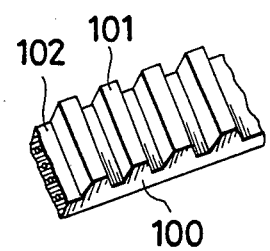
FIGS. 1(a) and (b) are partly perspective views of conventional toothed belts 100 and 103, respectively.
Figure 1B:
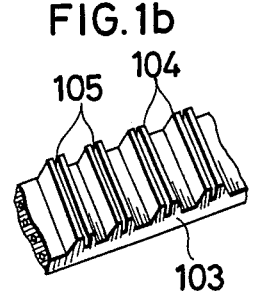
FIG. 1(c) is a partly perspective view of a conventional pulley 106.
Figure 1C:
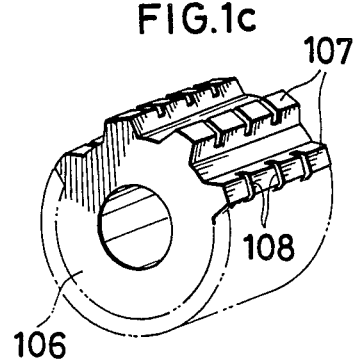
Figure 2:
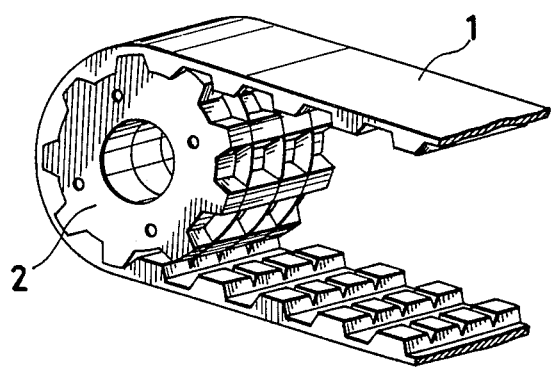
FIG. 2 is a partly perspective view of a belt drive system in accordance with this invention.
Figure 3:
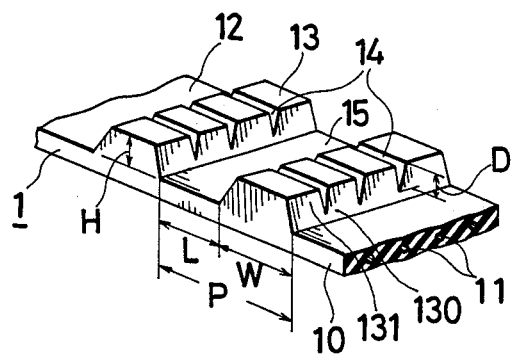
FIG. 3 is a partly perspective view of a toothed belt 1 in accordance with this invention.

FIG. 2 shows a belt drive system according to this invention, which comprises a toothed belt 1 and a pair of pulleys 2 (only one of which is shown in FIG. 2) engaging with the toothed belt 1. As shown in FIG. 3, the toothed belt 1 has a plurality of equally spaced teeth 13, on the surface 12 of the belt body 10, which are disposed at a right angle to the longitudinal direction of the belt 1. The belt teeth 13 have one or more cut grooves 14 in the longitudinal direction of the belt. The belt body 10 includes a tensile member 11 of helically wound stranded ropes consisting of aromatic polyamide fibers (e.g. Tradename Kevlar), polyester fibers, glass fibers or the like.

Figure 4:
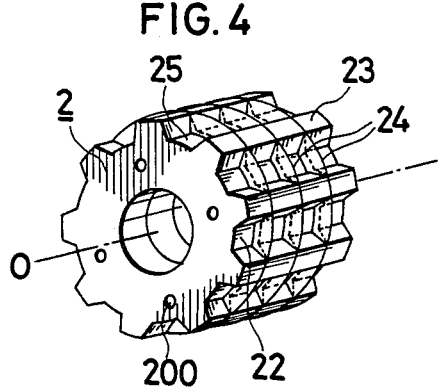
FIG. 4 is a perspective view of a pulley 2 in accordance with this invention.

FIG. 4 shows the pulley 2, which has a plurality of equally spaced teeth 23 and one or more ribs 24 on the surface 22 of the pulley body. The pulley teeth 23 are disposed parallel to the rotation axis 0 of the pulley 2 and engage with the belt teeth 13. The pulley ribs 24 run vertical to the rotation axis 0 of the pulley 2 and engage with the cut grooves 14 in the belt teeth 13. The number of the cut grooves 14 may be more than that of the ribs 24 but preferably is the same as that of the ribs 24.

The belt 1 engages with the pulley 2 in a belt driving in such a manner that the belt teeth 13 correspond to the bottom of the pulley tooth cavities 25 of the pulley teeth 23, the bottom of the belt tooth cavities 15 of the belt teeth 13 to the pulley teeth 23 and the cut grooves 14 in the belt teeth 13 to the pulley ribs 24.

Compressed air between the belt 1 and the pulley 2 when they engage with each other is eliminated through the cut grooves 14, so that the plosive sounds derived from the compressed air can be minimized. The belt 1 runs on the pulley 2 in such a manner that the cut grooves 14 disposed in the belt-running direction engage with the ribs 24 disposed in the rotation direction of the pulley 2, so that the belt 1 can drive in the given running direction without moving in a zigzag manner and/or slipping sideways. Because the belt 1 neither moves in a zigzag manner nor slips sideways on the pulley 2 in a belt driving, unnecessary friction between the belt 1 and pulley 2 does not occur thereby reducing heat generation and belt wear remarkably.

Since the belt 1 receives the pulley 2 by means of the cut grooves 14 in addition to the belt teeth 13 and the bottom of the belt tooth cavities 15 of the belt teeth 13, the contact area of the belt 1 to the pulley 2 is so large, as a whole, compared with that of the conventional belt that the contact pressure per unit of contact area of the belt 1 onto the pulley 2 can be reduced thereby improving the wear-resistance of the belt 1. The pressure of the pulley teeth 23 onto the bottom of the belt tooth cavities 15 of the belt teeth 13 is also reduced for the same reasons as mentioned above and, thus, the bottom of the belt tooth cavities 15 of the belt teeth 13 need not be enlarged for reducing the pressure of the pulley teeth 23 thereon thereby enlarging the theoretical width W (length of the tooth base in the longitudinal direction of the belt) of the belt teeth 13. The enlargement of the belt tooth width W allows the belt teeth 13 to be larger as a whole, so that the strength of the belt teeth 13 is improved and the belt 1 or a belt drive system using the belt 1 is useful for driving the cam shaft of large vehicles such as trucks, buses and the like which need a high capacity belt and for driving the rear wheel of motorcycles. The ratio of the width W of the belt teeth 13 to the length L (i.e. pitch P-tooth width W) of the tooth land 15 of the belt 1 ranges from about 0.8 to about 2. When tooth width W is excessively wide, the bending and the flexibility of the belt are reduced. When the tooth width W is excessively small, the strength of the belt teeth is decreased.

The depth D of the cut grooves 14 of the belt 1 ranges from about 60 to about 100 percent, preferably about 80 to about 100 percent, of the height H of the belt teeth 13. The strength of the belt teeth 13 depends generally upon the strength of the lower portion 130 of the belt teeth 13, which is located within approximately 20 percent of the height H of the belt teeth 13 from the tooth base. The remaining portion 131 of the belt teeth 13 serves mainly to engage with the pulley 2. Thus, even though the upper portion 131 of the belt teeth 13 is provided with the cut grooves 14, the strength of the belt teeth 13 is not decreased at all.

Figure 5:
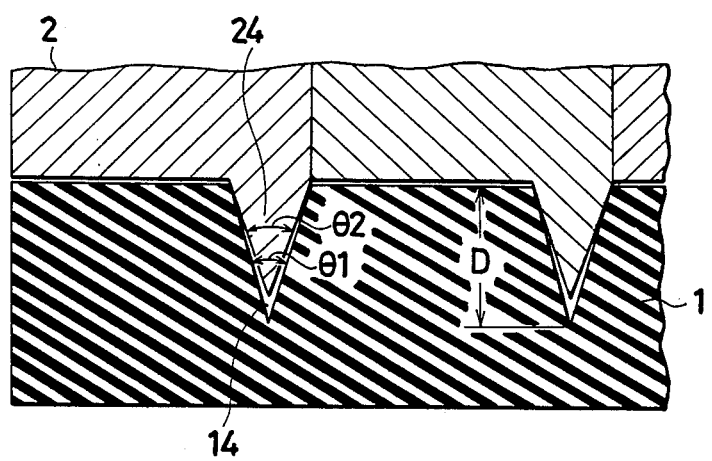
FIG. 5 is an enlarged sectional view showing the engagement of the above-mentioned toothed belt 1 with the above-mentioned pulley 2.

FIG. 5 shows an engagement of the belt 1 with the pulley 2. The open angle $\theta 1$ of the cut grooves 14 ranges from about 30 to about 50 degrees, preferably from about 30 to about 40 degrees. If the angle $\theta 1$ of the cut grooves 14 is excessively large, the opening width of the cut grooves 14 becomes so large that the upper portion 131 of the belt teeth 13 becomes small thereby decreasing the strength of the belt teeth. If the angle θ1 of the cut grooves 14 is excessively small, the opening width of the cut grooves 14 becomes so small that the aim of this invention cannot be attained.

The ratio of the angle θ1 of the cut grooves 14 to the angle θ2 of the pulley ribs 24 ranges from about 0.7 to about 1. When the rib angle 2 is excessively large, the height of the ribs 24 is decreased thereby weakening the engagement of the ribs 14 with the cut grooves 14. When the rib angle θ2 is small excessively, the ribs 14 cannot be properly engaged with the cut grooves 14. Using an excessively large or small rib angle θ2, the aim of this invention cannot be attained.

Figure 6:
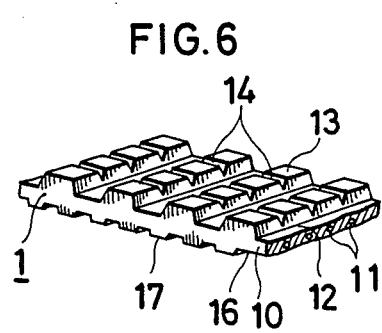
FIG. 6 is a partly perspective view of another toothed belt in accordance with this invention.
Figure 7:
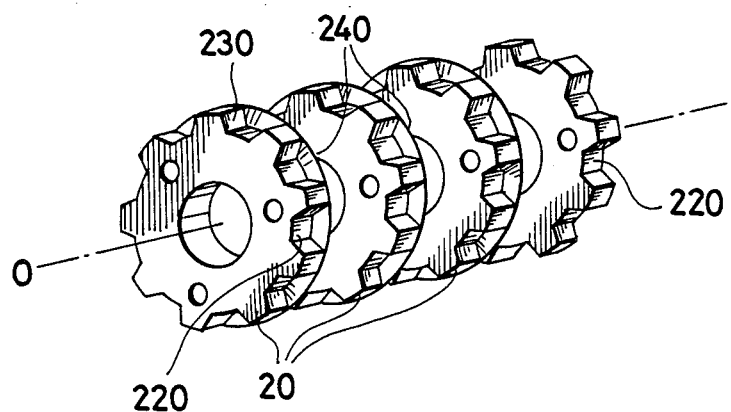
FIG. 7 is a disassembled view of the above-mentioned pulley 2.
Figure 8:
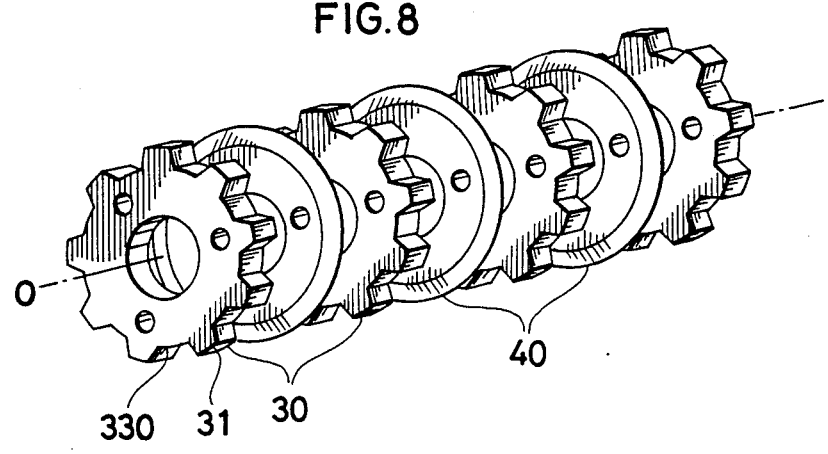
FIG. 8 is another disassembled view of the above-mentioned pulley 2.

FIG. 6 shows another belt 1 comprising a plurality of equally spaced teeth 13 and 17 on both surfaces 12 and 16 of the belt body 10, respectively. The belt teeth 13 are provided with one or more cut grooves 14 as mentioned before. The side of the teeth 13 of the belt 1 is mainly employed for a main drive and the other side of the belt 1 is mainly for an oil-pump drive or the like. The shape, size, pitch, etc., of the belt teeth 13 and 17 are not fundamental to this invention and can be determined depending upon the load imposed on these belt teeth. An example of the belt tooth shape is trapezoidal or round. (For example, Power Grip HTD belts manufactured by Uniroyal Inc., U.S.A. or S.T.P.D. belts as manufactured by The Goodyear Tire & Rubber Company, U.S.A.)

The belt 1 is, for example, manufactured by means of a unit molding technique wherein the surface of the belt teeth is covered by a woven cloth such as knit having an excellent expansibility in both longitudinal and lateral directions. The belt 1 can be also manufactured by grinding a conventional toothed belt to dispose predetermined cut grooves in the belt teeth. A woven cloth may be applied to the back face of the belt to improve rigidity in the lateral direction of the belt.

According to this invention, as mentioned above, the belt 1 engaging with the pulley 2 neither moves in a zigzag manner nor slips sideways, so that the pulley 2 does not require flanges as disposed in the conventional pulleys.

The belt 1 according to this invention, running without zigzag, can be employed as belts for paper money changing machines and automatic ticket-examination machines in which zigzag movement cannot be tolerated.

I claim:

1. A belt drive system comprising a toothed belt having a body and a plurality of equally spaced teeth on the surface of the belt body which includes tensile members therein, said belt teeth having one or more grooves in the longitudinal direction of the belt; and toothed pulleys having a body and a plurality of equally spaced teeth, which engage with the belt teeth, and one or more ribs on the surface of the pulley body of each pulley which engage with the grooves in the belt teeth, and extend across the cavities between adjacent teeth of the pulley, said ribs having a radial height not greater than the height of said pulley teeth.

2. A belt drive system according to claim 1, wherein the depth of said grooves ranges from about 60 to about 100 percent of the height of the belt teeth and the open angle formed by the sides of said grooves is from about 30 to about 50 degrees.

3. A belt drive system according to claim 1, wherein the ratio of the theoretical tooth width to the tooth land length ranges from about 0.8 to about 2.

4. A belt drive system according to claim 1, wherein the ratio of the open angle formed by the sides of said grooves in the belt teeth to the angle formed by the sides of said ribs on the pulleys ranges from about 0.7 to about 1.

5. In a belt drive system, a pulley having a body and a plurality of equally spaced teeth, parallel to the rotation axis, on the surface of the pulley body, and at least one rib, vertical to the rotation axis, on the surface of the pulley body, and extending across the cavities between adjacent teeth, the exterior surface of said rib being flush with or inside of the exterior surface of the pulley teeth.

6. A belt drive system according to claim 1, wherein the toothed pulleys each comprise a plurality of axially aligned disks with their teeth aligned, at least one of said disks having a rib at one edge thereof extending across the cavities between adjacent pulley teeth, said disks being secured together so that the pulley teeth engage with the teeth of the belt and the pulley rib engages with the grooves in the belt teeth.

7. A belt drive system according to claim 6, wherein the radial height of said rib is not greater than the radial height of said pulley teeth.

8. A belt drive system comprising:
  (1) a toothed belt having a body and a plurality of equally spaced teeth on the surface of the belt body which includes tensile members therein, said teeth having one or more grooves in the longitudinal direction of the belt, the depth of said grooves ranging from about 60 to about 100 percent of the height of the belt teeth, and the open angle formed by the sides of said grooves ranging from about 30 degrees to about 50 degrees; and
  (2) toothed pulleys each having a body and a plurality of equally spaced teeth which engage the belt teeth, and one or more ribs on the surface of the pulley body of each pulley which engage with the grooves of the belt teeth, the ratio of the open angle formed by the sides of said grooves in the belt teeth to the angle formed by the sides of said ribs on the pulleys ranging from about 0.7 to about 1.0.

9. In a belt drive system,
  a toothed belt having a body and a plurality of equally spaced teeth with intervening lands on one or both surfaces of the belt body which includes tensile members therein, said teeth having one or more grooves, in the longitudinal direction of the belt,
  toothed pulleys having a body, a plurality of equally spaced teeth engaging with the teeth of said belt, and one or more ribs which extends as the outer surface of each pulley across the cavities between adjacent teeth of each pulley and engage with said grooves, said grooves having a depth of between 60 to 100% of the height of the belt teeth, and the ratio of the theoretical tooth width to the toothed land length of said toothed belt ranged from about 0.8 to about 2.

* * * * *